US008619809B2

(12) United States Patent
Chalupsky et al.

(10) Patent No.: US 8,619,809 B2
(45) Date of Patent: Dec. 31, 2013

(54) METHOD, SYSTEM, AND PROGRAM FOR MANAGING A SPEED AT WHICH DATA IS TRANSMITTED BETWEEN NETWORK ADAPTORS

(75) Inventors: David L. Chalupsky, Banks, OR (US); James M. Ostrowski, Leander, TX (US); Thomas L. Stachura, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 189 days.

(21) Appl. No.: 13/226,485

(22) Filed: Sep. 6, 2011

(65) Prior Publication Data

US 2011/0317716 A1     Dec. 29, 2011

Related U.S. Application Data

(63) Continuation of application No. 10/656,652, filed on Sep. 4, 2003, now Pat. No. 8,019,887.

(51) Int. Cl.
*H04J 3/16*     (2006.01)
*H04J 3/22*     (2006.01)

(52) U.S. Cl.
USPC .......................................... 370/465; 709/233

(58) Field of Classification Search
USPC .......................................... 370/465; 709/233
See application file for complete search history.

(56) References Cited

U.S. PATENT DOCUMENTS

| | | | | |
|---|---|---|---|---|
| 5,881,240 A | * | 3/1999 | Asano | 709/233 |
| 6,026,494 A | * | 2/2000 | Foster | 713/320 |
| 6,298,042 B1 | * | 10/2001 | Murase et al. | 370/235 |
| 6,389,476 B1 | * | 5/2002 | Olnowich | 709/233 |
| 6,529,957 B1 | * | 3/2003 | Joergensen | 709/233 |
| 6,665,810 B1 | * | 12/2003 | Sakai | 713/600 |
| 6,789,130 B1 | * | 9/2004 | Benayoun et al. | 709/250 |
| 6,791,942 B2 | * | 9/2004 | Jin | 370/229 |
| 7,054,947 B2 | * | 5/2006 | Yun | 709/233 |
| 7,171,483 B2 | * | 1/2007 | Klein | 709/232 |
| 7,558,874 B1 | * | 7/2009 | Kodukula et al. | 709/237 |
| 2002/0196736 A1 | * | 12/2002 | Jin | 370/229 |
| 2003/0023665 A1 | * | 1/2003 | Matsunami et al. | 709/201 |
| 2003/0067939 A1 | * | 4/2003 | Feuerstraeter et al. | 370/465 |
| 2004/0003296 A1 | * | 1/2004 | Robert et al. | 713/300 |
| 2004/0117674 A1 | * | 6/2004 | Gutman et al. | 713/300 |
| 2004/0264498 A1 | * | 12/2004 | Feuerstraeter et al. | 370/465 |
| 2005/0055456 A1 | * | 3/2005 | Chalupsky et al. | 709/233 |

OTHER PUBLICATIONS

Merriam-Webster, Tangible, May 8, 2013.*

(Continued)

*Primary Examiner* — Brian P Whipple

(57) ABSTRACT

Provided are a method, system, and program for managing data transmissions at a local network device communicating with a linked network device over a network, wherein each network device is capable of transmitting data at different speeds. An operation is initiated to change a current transmission speed at which data is transmitted between the local and linked network devices in response to a speed change event. A determination is made of a new transmission speed different from the current transmission speed. A register is set in the local network device to indicate the new transmission speed. A speed change request and the new transmission speed are transmitted to the linked network device to cause the local and linked network devices to communicate at the new transmission speed, wherein the transmission occurs without terminating a linked exchange occurring between the local and linked network devices.

19 Claims, 4 Drawing Sheets

(56) References Cited

OTHER PUBLICATIONS

Bunch, B., "An Introduction to Auto-Negotiation", [online], Feb. 19995, (Retrieved on Oct. 30, 2002).

Hernandez, R., "Gigabit Ethernet: Auto-Negotiation", Power Solutions, pp. 117-122.

IEEE Computer Society, "802.3—IEEE Standard for Information Technology—Telecommunications and Information Exchange Between Systems—Local and Metropolitan Area Networks—Specific Requirements—Part 3: Carrier Sense Multiple Access with Collision Detection (CSMNCD) Access Method and Physical Layer Specifications", IEEE Sid 802.3, Mar. 8, 2002,Introduciion, Section I, Section 22, Section 23, Section 24, and Section 28, pp. i-xxiii, 1-32,9-55, 56-131,132-167, & 213-260 respectively.

IEEE, "Information Technology—Telecommunications and Information Exchange Between Systems—Local and Metropolitan Area Networks—Specific Requirements—Part 11: Wireless LAN Medium Access Control (MAC) and Physical Layer (PHY) Specifications," IEEE Standard 802.11-1997, Section 9.6, p. 96, 1997.

IEEE, "Information Technology—Telecommunications and Information Exchange Between Systems—Local and Metropolitan Area Networks:—Specific Requirements—Part 11: Wireless LAN Medium Access Control (MAC) and Physical Layer (PHY) Specifications," IEEE Standard 802.11-1999, Section 9.6, p. 95, 1999.

IEEE, "Supplement to IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Higher-Speed Physical Layer Extension in the 2.4 GHz Band," IEEE Standard 802.11 b-1999, Section 9.6, p. 6, Jan. 20, 2000.

IEEE, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications, Amendment 4: Further Higher Data Rate Extension in the 2.4 GHz Band," IEEE Standard 802.11 g-2003, Section 9.6, p. 12, Jun. 27, 2003.

Brenner, Pablo, "A Technical Tutorial on the IEEE 802.11 Protocol," published by BreezeCom Wireless Communications Inc., 24 pages, Jul. 18, 1996.

Notice of Allowance received for U.S. Appl. No. 10/656,652, mailed on May 9, 2011, 8 Pages.

Final Office Action received for U.S. Appl. No. 10/656,652, mailed on Sep. 24, 2007, 16 Pages.

Non-Final Office Action received for U.S. Appl. No. 10/656,652, mailed on May 7, 2007, 14 Pages.

\* cited by examiner

METHOD, SYSTEM, AND PROGRAM FOR MANAGING A SPEED AT WHICH DATA IS TRANSMITTED BETWEEN NETWORK ADAPTORS

CROSS REFERENCE TO RELATED APPLICATIONS

This application is a continuation of and claims priority to U.S. application Ser. No. 10/656,652, entitled "METHOD, SYSTEM, AND PROGRAM FOR MANAGING A SPEED AT WHICH DATA IS TRANSMITTED BETWEEN NETWORK ADAPTORS", filed Sep. 4, 2003, issued as U.S. Pat. No. 8,019,887 on Sep. 13, 2011, which is hereby incorporated herein for all purposes.

BACKGROUND OF THE INVENTION

1. Field of the Invention

The present invention relates to a method, system, and program for managing a speed at which data is transmitted between network adaptors.

2. Description of the Related Art

In a network environment, a network adaptor card on a host computer, such as an Ethernet card, Fibre Channel card, etc., will receive Input/Output (I/O) requests or responses to I/O requests initiated from the host. Often, the host computer operating system includes a device driver to communicate with the network adaptor, and provide an interface between the host operating system and the network adaptor.

When two Ethernet cards communicate over a network, they both engage in an auto-negotiation protocol to select a highest possible common mode speed at which both are capable of communicating, such as 10 megabits per second (Mbps), 100 Mbs, 1000 tyros, half duplex, full duplex, etc. During auto-negotiation, the Ethernet devices transmit a series of link pulses that advertise their capabilities to the other device that shares the link segment. Devices transmit a Link Code Word (LCW) that is encoded with the device transmission capabilities. The hardware in the Ethernet cards is configured to select the highest common speed between the two devices based on the capabilities communicated in the link pulses. Further details of the auto-negotiation process to select a highest common speed between two network devices is described in the publication IEEE Standard 802.3-2002 (Copyright by the institute of Electrical and Electronic Engineers (IEEE), 2002), which publication is incorporated herein by reference in its entirety.

With prior art Ethernet auto-negotiation, the two linked devices communicate at the highest common speed, regardless of whether the highest speed is needed. Transmissions at higher speeds consume greater power than lower speed transmissions. Moreover, devices may be consuming additional power to transmit at the highest common link speed when such high speeds are not needed. For instance, lower speed transmissions may be sufficient when checking electronic mail or "surfing" the Internet. Power conservation may be especially important for battery powered computing devices, such as laptops, hand held computers, etc., and computers deployed in an energy conservation sensitive environment.

For these reasons, there is a need in the art to provide improved techniques for managing the transmission speed between network devices.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
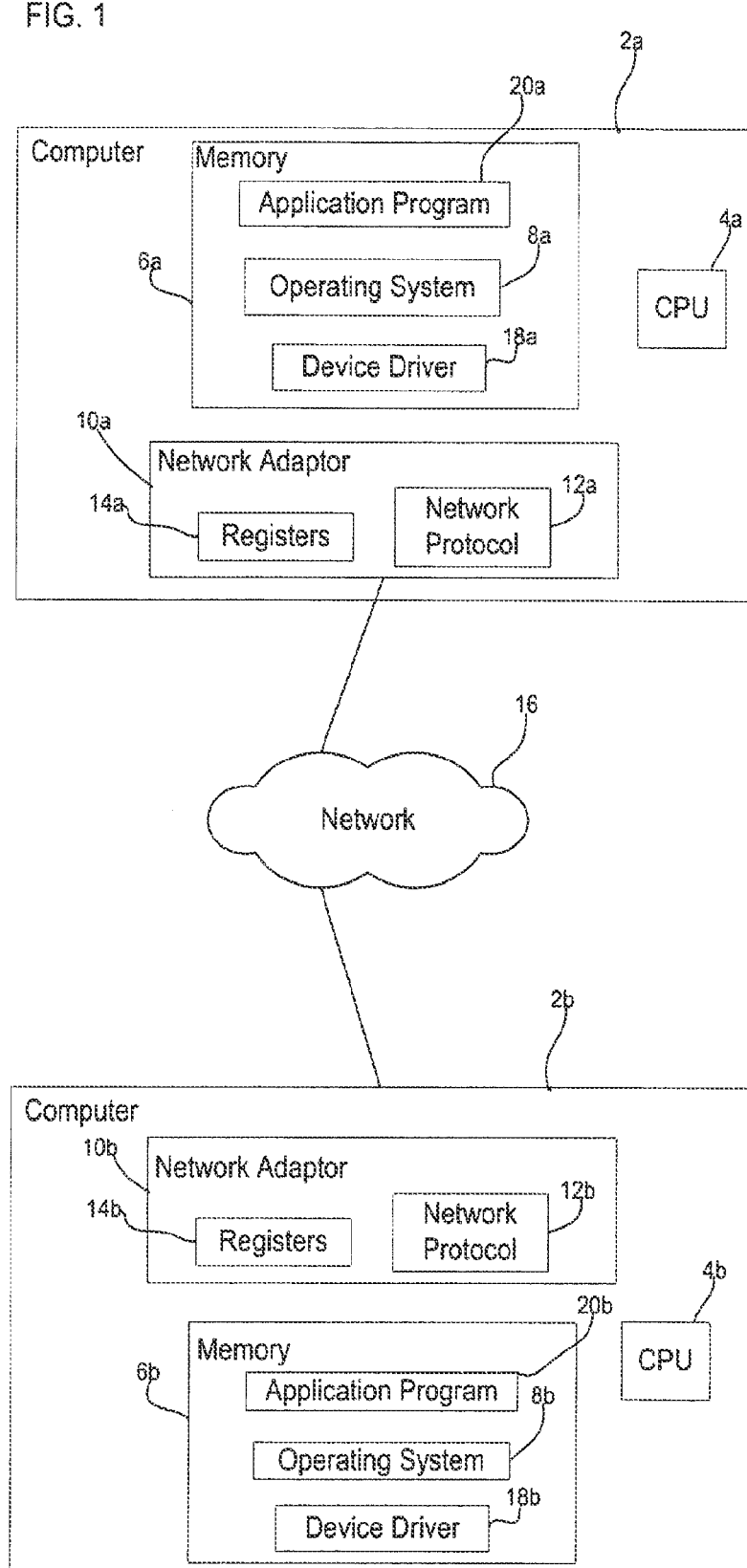
FIG. 1 illustrates a computing environment in which aspects of the invention are implemented.

FIG. 1 illustrates a computing environment in which aspects of the invention may be implemented. Two computers 2a, 2b include a central processing unit (CPU) 4a, 4b, a memory 6a, 6b, an operating system 8a, 8b, and a network adaptor 10a, 10b. The network adaptors 10a, 10b may be implemented in a card inserted in a slot in the computers 2a, 2b or be implemented on the computer 2a, 2b motherboard, e.g., LAN On Motherboard (LOM). The network adaptor 10a, 10b may communicate with the computer 2a, 2b, respectively, using any bus protocol known in the art, such as Peripheral Component Interconnect (PCI), PCI-X, Communication Streaming Architecture (CSA), PCI-E, etc. The computers 2a, 2b may comprise any computer system known in the art, such as a mainframe, server, personal computer, storage controller, workstation, laptop, handheld computer, etc. In further embodiments, the network adaptor 10a, 10b may be included in alternative types of computing devices, such as telephony device, network appliance, virtualization devices, etc. Any CPU 4a, 4b and operating system 8a, 8b known in the art may be used, The network adaptor 10a, 10b includes a network protocol 12a, 12b implementing the network adaptor functions, such as auto-negotiation and others, to send and receive network packets between the network adaptors 10a, 10b. The network adaptors 10a, 10b further include registers 14a, 14b that maintain information used during adaptor operations, such as the advertised capabilities of the network adaptor, e.g., 10 Mbs, 100 Mbs, 1000 Mbs, half-duplex, full-duplex, etc. The network 16 may comprise a Local Area Network (LAN), the Internet, a Wide Area Network (WAN), Storage Area Network (SAN), etc. In certain embodiments, the network adaptors 10a, 10b and network protocol 12a, 12b may implement the Ethernet protocol, token ring protocol, Fibre Channel protocol, Infiniband, Serial Advanced Technology Attachment (SATA), parallel SCSI, serial attached SCSI cable, etc., or any other network communication protocol known in the art.

The computers 2a, 2b further include a device driver 18a, 18b that executes in memory 6a, 6b and includes network adaptor 10a, 10b specific interfaces to communicate with and control the network adaptor 10a, 10b and interface between the operating system 8a, 8b and the network adaptor 10a, 10b. The computers 2a, 2b may further include a transport protocol driver (not shown) executing in memory that processes the content of messages included in the packets received at the network adaptor 12a, 12b that are wrapped in a transport layer, such as TCP and/or IP, Internet Small Computer System Interface (iSCSI), Fibre Channel SCSI, parallel SCSI transport, or any other transport layer protocol known in the art, in further embodiments, the transport protocol driver operations may be performed within the network adaptor 10a, 10b hardware, such as the case with a Transport Offload Engine (TOE) adaptor.

The computers 2a, 2b also include one or more application programs 20a, 20b that execute in memory 6a, 6b to perform various operations, including transmitting and receiving data through the network adaptors 10a, 10b.

Figure 2:
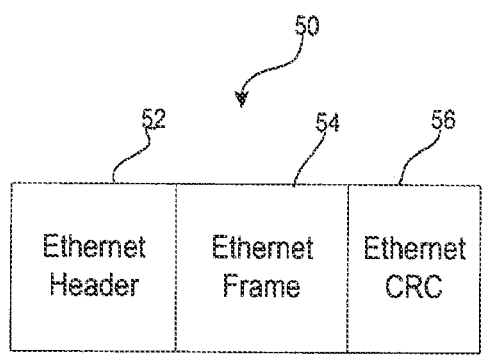
FIG. 2 illustrates a format of network packets used in accordance with embodiments of the invention.

FIG. 2 illustrates a format of network packets 50 that the network adaptors 10a, 10b may transmit. The network packets 50 include an Ethernet header 52, an Ethernet data frame 54, and an Ethernet cycle redundancy check (CRC) code 56 used to perform link-level error detection at any point from start to end and including middle points in the data transmission path between the network adaptors 10a, 10b. The Ethernet packet 50 may include additional fields and flags not shown that are known in the art and used for Ethernet communication. In certain embodiments, certain data bits in an Ethernet packet 50 may be used to signal a network adaptor 10a, 10b to change the transmission speed.

Figure 3:
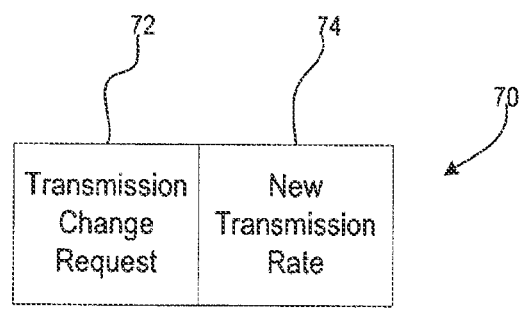
FIG. 3 illustrates data for a transmission change request in accordance with embodiments of the invention.

FIG. 3 illustrates speed change request codes 70 that may be included in the Ethernet packet 50 to indicate a speed change, including a transmission change request 72 that is the code signaling the linked network adaptor to change speeds and the new transmission speed 74. The speed change request codes 70 may be included in the Ethernet packet, in the preamble transmitted at the beginning of the packet or idle transmissions that occur between Ethernet packets. Preambles are typically transmitted during idle time periods at the beginning of each Ethernet packet transmission and are used for clock synchronization, whereas idle transmissions occur between packets.

Figure 4:
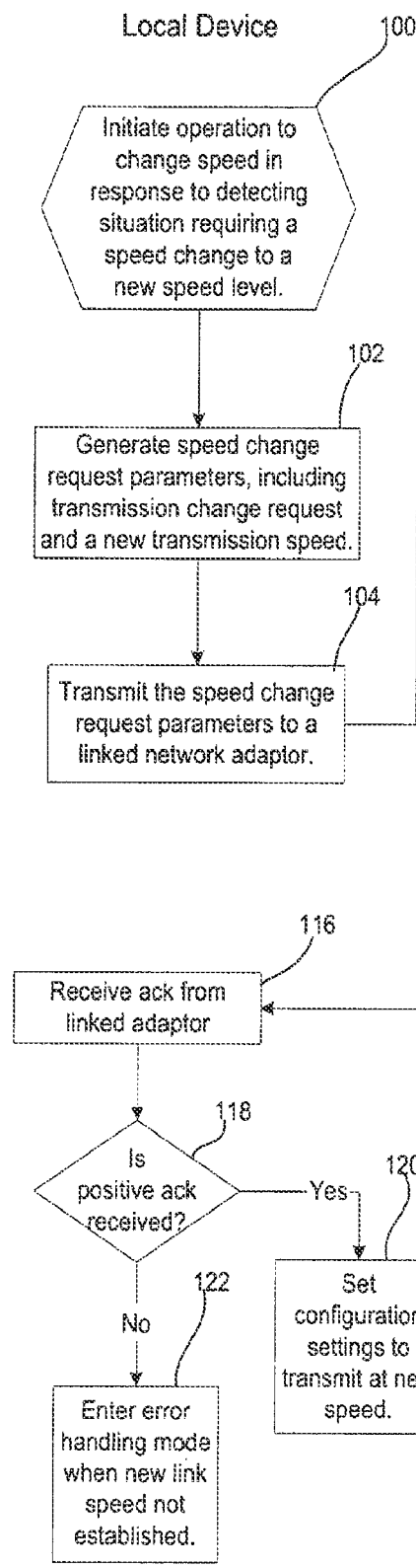
FIGS. 4, 5, and 6 illustrate logic to change a transmission speed between network adaptors in accordance with embodiments of the invention.
Figure 5:
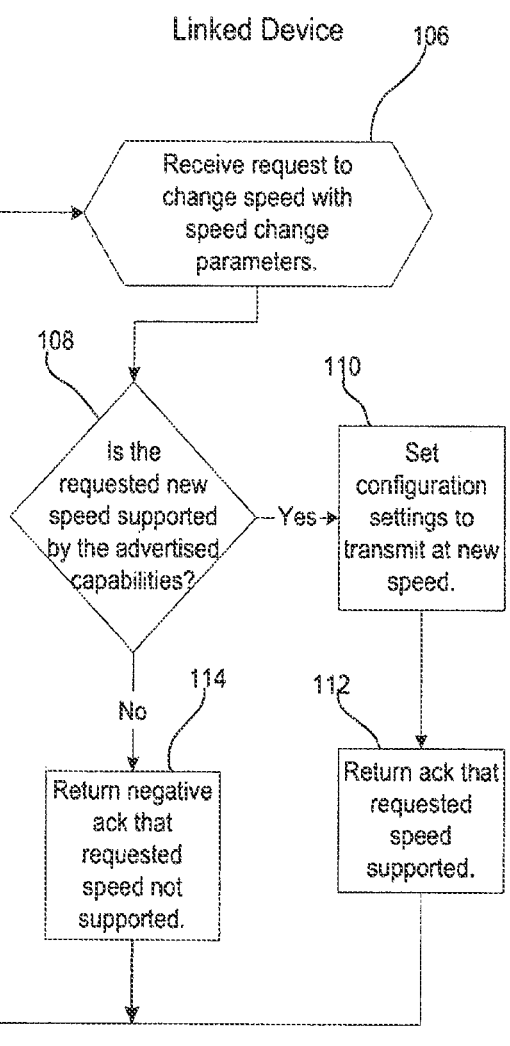

FIGS. 4 and 5 illustrate operations performed by the network protocol 12a, 12b logic of the network adaptors 10a, 10b to effect a change in transmission speed in response to the occurrence of a transmission speed change event. The network protocol 12a, 12b may be implemented as hardware logic in the network adaptor 10a, 10b. A transmission speed change event can be triggered by the device driver 18a, 18b or some other component in the computer 2a, 2b. For instance, the device driver 18a, 18b may implement an application programming interface (API) call that allows the application program 20a, 20b to change the transmission speed. If the application program 20a, 20b anticipates performing operations consuming significant network 16 resources, e.g., such as a network request for large files, such as a multi-media file (e.g., video, audio, etc.), new program or program update to download, etc., then the application program 20a, 20b may invoke the speed change API to cause the device driver 18a, 18b to, in response, perform operations to effectuate the transmission speed change operations. Additionally, a device driver 18a, 18b API may be provided to allow an application program 20a, 20b to reduce the transmission speed. In additional embodiments, the device driver 18a, 18b or some other component in the computer 2a, 2b may request the network adaptor 10a, 10b to adjust the transmission speed in response to detecting changes in network traffic at the network adaptor. For instance, if increased or decreased traffic is detected at the network adaptor 10a, 10b, then action may be taken to cause the network protocol 12a, 12b to perform the operations described in FIGS. 4 and 5. In the description in FIGS. 4 and 5, the network adaptor 10a is described as the local device where the speed change is initiated and the network adaptor 10b is described as the linked device that responds to the speed change initiated by the local device 10a. However, the network protocol 12a, 12b enables any of the network adaptors 10a, 10b to function as a local device or linked device.

With respect to FIG. 4, after initiating an operation to change the speed (at block 100), the local network adaptor 10a generates (at block 102) a speed change request 70 including a new transmission speed 74 (FIG. 3), such as 10 BASE-T, 100 BASE-TX, 100 BASE-T4, 100 BASE-T, 1000 BASE-X, 1000 BASE-T, etc., and transmits (at block 104) the speed change request to the linked network adaptor 10b.

FIG. 5 illustrates operations performed by the network protocol 12b in the linked network adaptor 10b. With respect to FIG. 5, upon receiving (at block 106) the speed change request, which may be implemented in bits in an Ethernet packet, the preamble that is transmitted at the beginning of the packets or the idle transmissions that occur between packets, the linked network adaptor 10b determines (at block 108) whether the requested new transmission speed 74 is supported by the advertised capabilities indicated in the registers 14b of the linked network adaptor 10b. If (at block 108) the linked network adaptor 10b supports the requested new transmission speed 74, then the linked network adaptor 10a sets (at block 110) the configuration registers 14b to implement the requested new transmission speed 74 and returns (at block 112) acknowledgment to the local network adaptor 10a that the speed change is implemented at the linked network adaptor 10b. If (at block 108) the linked network adaptor 10b does not support the requested new transmission speed 74, as indicated in the registers 14b of the linked network adaptor 10b, then negative acknowledgment is returned (at block 114) to the local network adaptor 10a indicating that the linked network adaptor 10b does not support the requested new transmission speed 74.

With respect to FIG. 4, upon the local network adaptor 10a, 10b receiving (at block 116) the acknowledgment request, if (at block 118) acknowledgment is positive, then the local network adaptor 10a sets (at block 120) the configuration registers 14a to indicate data transmission at the requested new transmission speed. Otherwise, if negative acknowledgment was returned, then the local network adaptor 10a enters block 122) an error handling mode. In this error handling mode, the network adaptor 10a may continue to transmit at the previously negotiated speed, which would be the highest common transmission speed between the local and linked adaptors 10a, 10b. Alternatively, the local network adaptor 10a may determine the next higher or lower transmission speed the local network adaptor 10a supports, depending upon whether the speed change request was to increase or decrease the transmission speed, respectively, and then perform the logic of FIG. 4 with respect to a next higher or lower transmission speed.

In still further alternative embodiments, the local network adaptor 10a may be aware of the transmission capabilities of the linked network adaptor 10b, which would be determined when the local and linked network adaptors 10a, 10b initially establish communication. In such embodiments, the local network adaptor 10a would select the next highest or lowest common transmission speed between the local and linked network adaptors 10a, 10b as the new transmission speed, depending on whether the speed change request is to increase or decrease the transmission speed, respectively. Such embodiments would avoid the situation where the linked network adaptor 10b returns negative acknowledgment due to the local network adaptor 10a requesting a new transmission speed the linked network adaptor 10b does not support.

Still further, the speed change request may request that the speed change be to an absolute highest or lowest speed, which would cause the local network adaptor 12a to attempt communication at the very highest or lowest supported speed, respectively. Additionally, the speed change request may request a speed that is some number of levels higher or lower than the current speed, assuming the local device supports multiple different speed levels. In such case, the local network adaptor would attempt to establish communication at the requested number of levels higher or lower than the current transmission speed.

Figure 6:
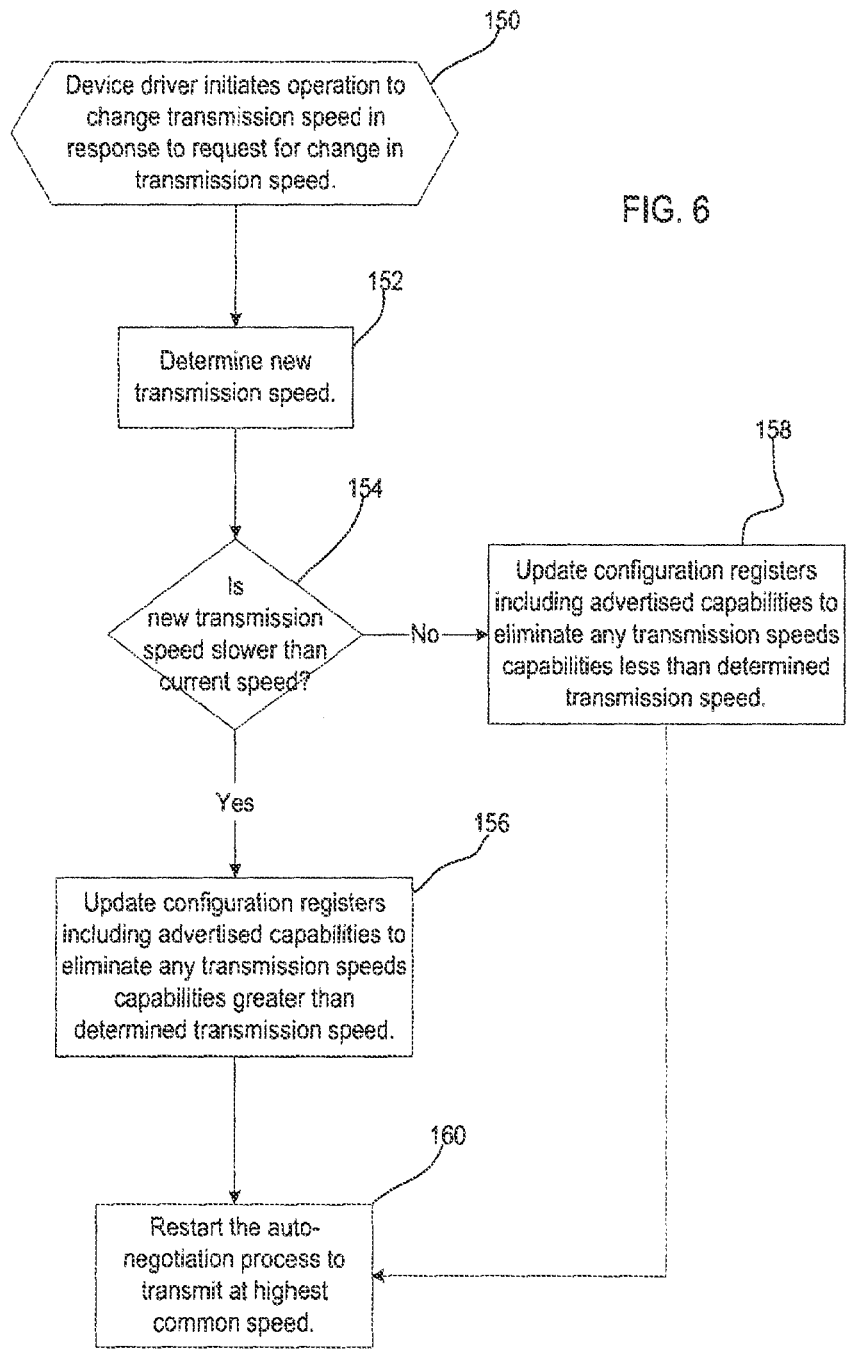

FIG. 6 illustrates logic implemented in the device driver 18a, 18b to initiate a speed change between the local network adaptor 10a, 10b and a linked network adaptor. The device drivers 18a, 18b may initiate an operation to change the speed in response to a request from an application 20a, 20b or in response to detecting a change in network traffic at the network adaptor 10a, 10b, as discussed above. For purposes of this description, device driver 18a will be described as the local device driver 18a in the local network adaptor 10a initiating the speed change operation and device driver 18b will be described as the linked device driver 18b in the linked network adaptor 10b that responds to the speed change request form the local network adaptor 10a, However, both device drivers 18a, 18b can function as the local and linked device drivers 18a, 18b. Upon initiating (at block 150) a speed change operation, the local device driver 18a determines (at block 152) the new transmission speed. In embodiments where the local device driver 18a detects the need to adjust the speed as a result of a predefined change in network traffic, the device driver 18a may include code to determine the appropriate new transmission speed for the detected change. Alternatively, if the application 20a calls an API to change the speed, then either the local device driver 18a, application 20a or the network protocol 12a may determine the new transmission speed.

If (at block 154) the new transmission speed is slower than the current transmission speed, then the device driver 18a calls (at block 156) the network protocol 12a to update the configuration registers 14a including advertised capabilities to eliminate any settings indicating transmission speeds capabilities greater than the determined transmission speed. Otherwise if the new transmission speed is greater than the current speed, then the device driver 18a calls the network protocol 12a to update (at block 158) the configuration registers 14a including advertised capabilities to eliminate any transmission speeds capabilities less than determined transmission speed. Before updating the transmission speed at blocks 156 or 158, the device driver 18a may reset the registers 14a including the advertised capabilities to the initial default values to undo any previous speed setting changes before the current updating is performed to eliminate advertised speed capabilities above or below the determined speed capability. From block 156 or 158, the device driver calls the network protocol 12a to restart (at block 160) the auto-negotiation process to negotiate with the linked network adaptor 10b to transmit at the highest common speed based on the new advertised capabilities of the local network adaptor 12a set by the device driver 18a. Thus, if the device driver 18a had eliminated the higher speed transmission in the advertised capabilities registers 14a, then the network adaptors 10a, 10b would establish communication at the highest common speed of the remaining speeds indicated in the capability registers 14a of the local network adaptor 10a.

In certain embodiments, the local device driver 18a may be aware of the transmission speed capabilities of the linked network adaptor 10a. In such embodiments, the local device driver 18a may set the new transmission speed to the next highest or lowest common speed depending on whether the speed adjustment is to increase or decrease the speed, respectively.

With the described embodiments of FIGS. 4 and 5, changing the network transmission speed can occur without any noticeable delay to the user because the request change is transmitted during normal packet transmissions within a packet or within a preamble, so that the change occurs almost immediately once the linked network adaptor determines that the requested new speed is supported and returns positive acknowledgment. Thus, the speed change request is transmitted without terminating the linked exchange occurring between the local and linked network devices. Once the positive acknowledgment is returned, both network adaptors may begin transmitting at the requested new transmission speed. Until the positive acknowledgment is returned, the network adaptors communicate using the previously negotiated transmission speed. The described embodiment of FIG. 6 may take longer to implement the new transmission speed than the embodiment of FIGS. 4 and 5 because the device driver causes the speed to change by restarting the auto-negotiation process to negotiate a speed with the new advertised capabilities of the network adaptor having fewer indicated capabilities. With the embodiment of FIG. 6, transmissions are delayed until the new transmission speed is auto-negotiated, which may be noticeable to a user. However, with FIG. 6, the speed change request occurs without terminating the linked exchange occurring between the local and linked network devices.

The described embodiments provide techniques to change the transmission speed used to transmit data between network adaptors. The described embodiments allows a change to a slower transmission speed if current network traffic is relatively low. Lowering the transmission speed can conserve energy consumed by the network adaptor, which may be important for portable devices and energy conservation. Moreover, the described embodiments allow an increase in the transmission speed in the event that traffic has increased at the network adaptor or an application program anticipates a need for additional network transmission speed and bandwidth to accommodate anticipated large data transmissions.

Additional Embodiment Details

The described techniques for changing the data transmission speed between network adaptors may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of Manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

in the described embodiments, certain operations were described as being performed by the device driver 10a, 10b and network protocol 12a, 12b. In alterative embodiments, operations described as performed by the device driver 10a, 10b may be performed by the network protocol 12a, 12b, and vice versa.

In described embodiments, the speed adjustment to a higher or lower transmission speed may include going to a higher or lower megabits per second rate, going from either full duplex to half duplex, or vice versa, or changing to any transmission mode known in the art that is supported by the network adaptors and provides a higher or lower data transmission rate than the current transmission rate, In the described embodiments, the network protocol comprised the Ethernet protocol. In alternative embodiments, the network protocol may comprise any network protocol known in the art, including Fibre Channel, Wireless Fidelity (WiFi), etc.

In the described embodiments, the network adaptors are shown as being included in different devices or enclosures. In alternative embodiments, the network adaptors may he included in a same device or enclosure.

In certain implementations, the device driver and network adaptor embodiments my be included in a computer system including a storage controller, such as a SCSI, Integrated Drive Electronics (IDE), Redundant Array of Independent Disk (RAID), etc., controller, that manages access to a non-volatile storage device, such as a magnetic disk drive, tape media, optical disk, etc. In alternative implementations, the network adaptor embodiments may be included in a system that does not include a storage controller, such as certain hubs and switches.

In certain implementations, the device driver and network adaptor embodiments may be implemented in a computer system including a video controller to render information to display on a monitor coupled to the computer system including the device driver and network adaptor, such as a computer system comprising a desktop, workstation, server, mainframe, laptop, handheld computer, etc. Alternatively, the network adaptor and device driver embodiments may be implemented in a computing device that does not include a video controller, such as a switch, router, etc.

In certain implementations, the network adaptor may be configured to transmit data across a cable connected to a port on the network adaptor. Alternatively, the network adaptor embodiments may he configured to transmit data over a wireless network or connection, such as wireless LAN, Bluetooth, Wireless Fidelity (Wi-Fi), etc.

The illustrated logic of FIGS. 4, 5, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A network device comprising circuitry, the network device comprising logic to perform operations to:
cause transmission of an Ethernet frame toward a link partner over a link, the frame encoding a request to change the transmission speed of the link from a current, non-zero transmission speed of the link, to a different, non-zero transmission speed;
after operations to transmit the Ethernet frame, continue to transmit Ethernet frames at the current, non-zero transmission speed of the link;
in response to a received acknowledgement of the Ethernet frame, change the speed of the link in accordance with the request to the different, non-zero transmission speed;
in response to a received negative acknowledgement of the Ethernet frame, not changing the speed of the link in accordance with the request to the different, non-zero transmission speed.

2. The network device of claim 1, wherein the current, non-zero transmission speed comprises a transmission speed determined by an auto-negotiation to select a common speed offered by the network device and the link partner.

3. The network device of claim 1,
wherein the different, non-zero transmission speed of the link comprises one of the following: 10BASE-T, 100BASE-TX, 100BASE-TV, 100BASE-T, 1000BASE-X, and 1000BASE-T.

4. The network device of claim 1,
further comprising operations to transmit the Ethernet frame in response to, and based on, a determined level of network traffic.

5. The network device of claim 1, further comprising logic to perform operations to:
determine the different, non-zero transmission speed based on advertised speed capabilities of the link partner; and
encode the different, non-zero transmission speed in the Ethernet frame.

6. The network device of claim 1, further comprising logic to perform operations to:
access a second Ethernet frame encoding a request to change the transmission speed of the link from a current, non-zero transmission speed of the link determined by an auto-negotiation to select a common speed offered by link partners, to a different, non-zero transmission speed; and
transmit a negative acknowledgement of the Ethernet frame to the link partner.

7. The network device of claim 1, wherein the network device comprises a network device integrated on a computer motherboard.

8. A method comprising:
causing transmission of an Ethernet frame toward a link partner over a link, the frame encoding a request to change the transmission speed of the link from a current, non-zero transmission speed of the link, to a different, non-zero transmission speed;
after causing transmission of the Ethernet frame, continuing transmission of Ethernet frames at the current, non-zero transmission speed of the link;

in response to a received acknowledgement of the Ethernet frame, changing the speed of the link in accordance with the request to the different, non-zero transmission speed;

in response to a received negative acknowledgement of the Ethernet frame, not changing the speed of the link in accordance with the request to the different, non-zero transmission speed.

9. The method of claim 8, wherein the current, non-zero transmission speed comprises a transmission speed determined by an auto-negotiation to select a common speed offered by the network device and the link partner.

10. The method of claim 8,
wherein the different, non-zero transmission speed of the link comprises one of the following: 10BASE-T, 100BASE-TX, 100BASE-TV, 100BASE-T, 1000BASE-X, and 1000BASE-T.

11. The method of claim 8,
further comprising operations to transmit the Ethernet frame in response to, and based on, a determined level of network traffic.

12. The method of claim 8, further comprising:
determining the different, non-zero transmission speed based on advertised speed capabilities of the link partner; and
encoding the different, non-zero transmission speed in the Ethernet frame.

13. The method of claim 8, further comprising:
accessing a second Ethernet frame encoding a request to change the transmission speed of the link from a current, non-zero transmission speed of the link determined by an auto-negotiation to select a common speed offered by link partners, to a different, non-zero transmission speed; and
causing transmission of a negative acknowledgement of the Ethernet frame to the link partner.

14. An article of manufacture, disposed on a non-transitory tangible computer readable medium, comprising programmatic logic to cause a processor to:
cause transmission of an Ethernet frame toward a link partner over a link, the frame encoding a request to change the transmission speed of the link from a current, non-zero transmission speed of the link, to a different, non-zero transmission speed;
after operations to transmit the Ethernet frame, continue to transmit Ethernet frames at the current, non-zero transmission speed of the link;
in response to a received acknowledgement of the Ethernet frame, change the speed of the link in accordance with the request to the different, non-zero transmission speed;
in response to a received negative acknowledgement of the Ethernet frame, not changing the speed of the link in accordance with the request to the different, non-zero transmission speed.

15. The article of claim 14, wherein the current, non-zero transmission speed comprises a transmission speed determined by an auto-negotiation to select a common speed offered by the network device and the link partner.

16. The article of claim 14,
wherein the different, non-zero transmission speed of the link comprises one of the following: 10BASE-T, 100BASE-TX, 100BASE-TV, 100BASE-T, 1000BASE-X, and 1000BASE-T.

17. The article of claim 14,
further comprising programmatic logic to transmit the Ethernet frame in response to, and based on, a determined level of network traffic.

18. The article of claim 14, further comprising programmatic logic to:
determine the different, non-zero transmission speed based on advertised speed capabilities of the link partner; and
encode the different, non-zero transmission speed in the Ethernet frame.

19. The article of manufacture of claim 14, further comprising programmatic logic to:
access a second Ethernet frame encoding a request to change the transmission speed of the link from a current, non-zero transmission speed of the link determined by an auto-negotiation to select a common speed offered by link partners, to a different, non-zero transmission speed; and
transmit a negative acknowledgement of the Ethernet frame to the link partner.

* * * * *